UNITED STATES PATENT OFFICE.

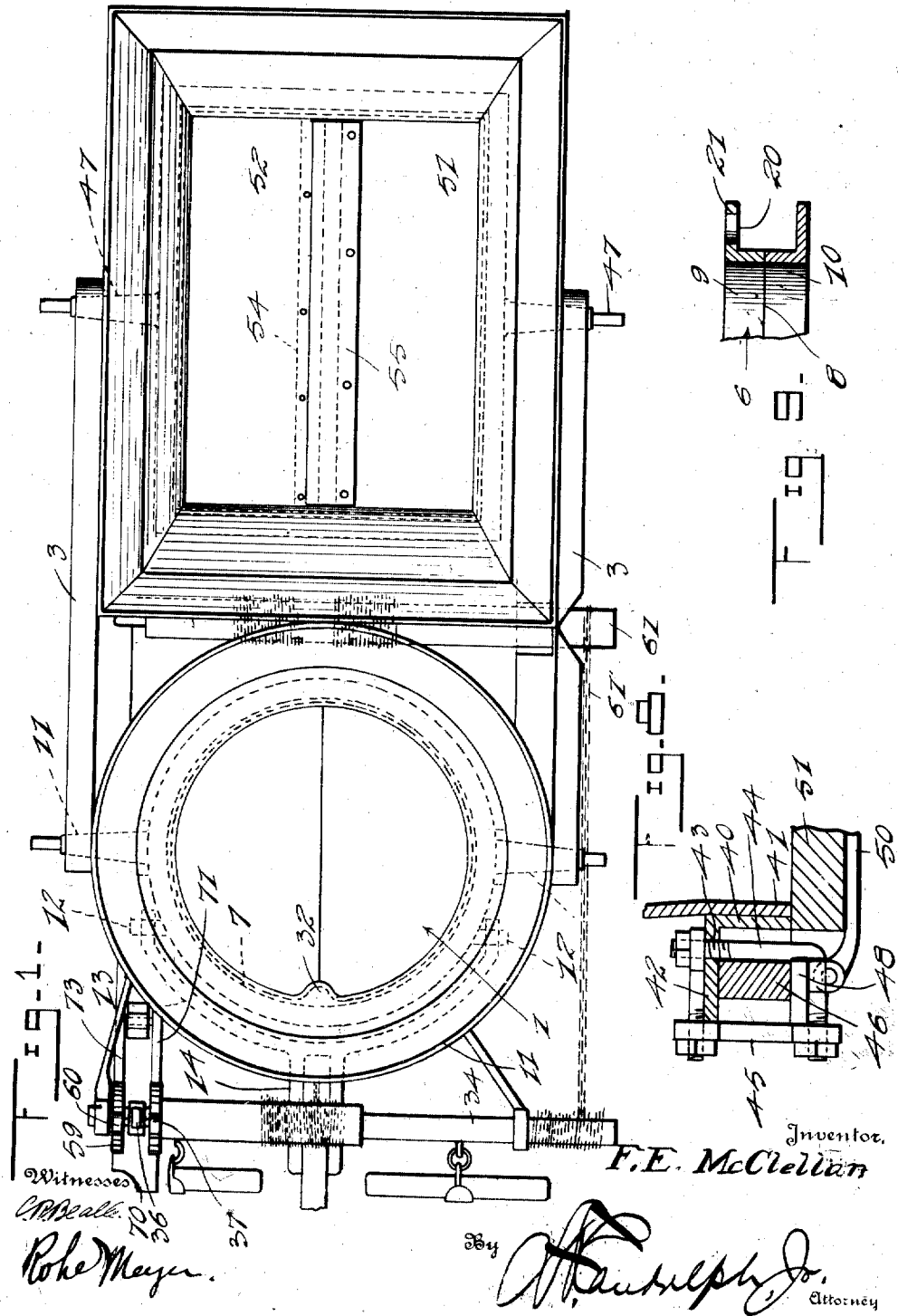

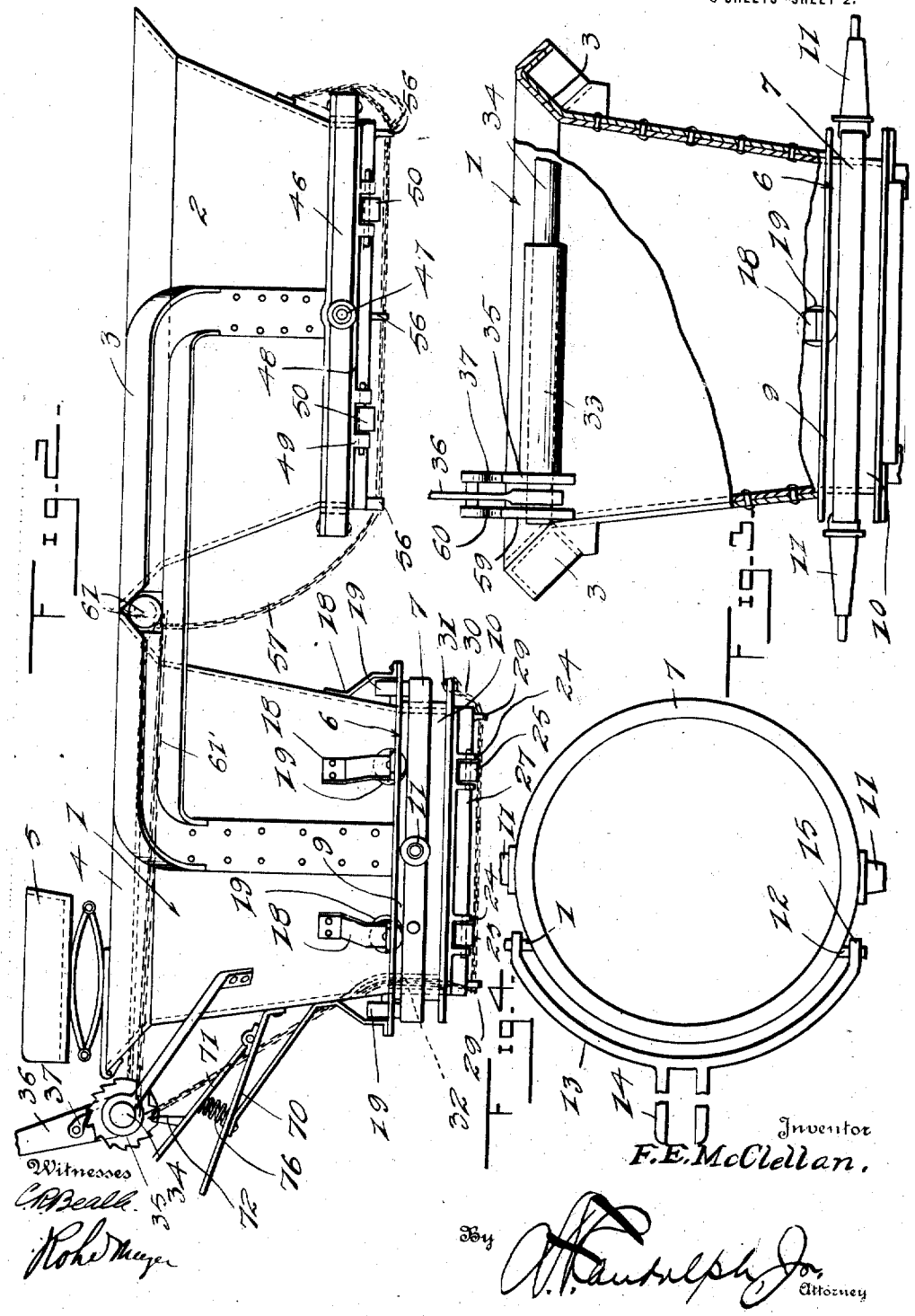

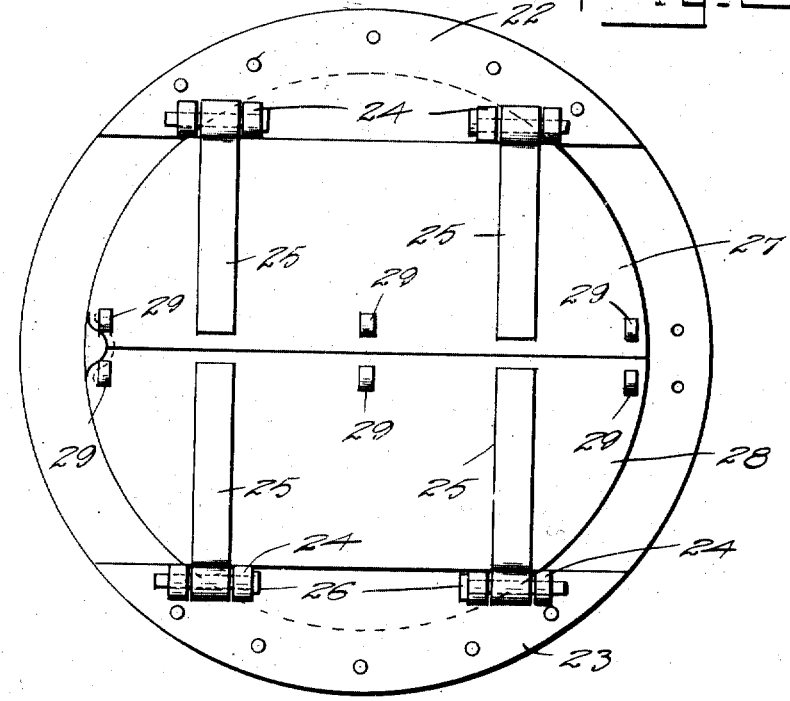
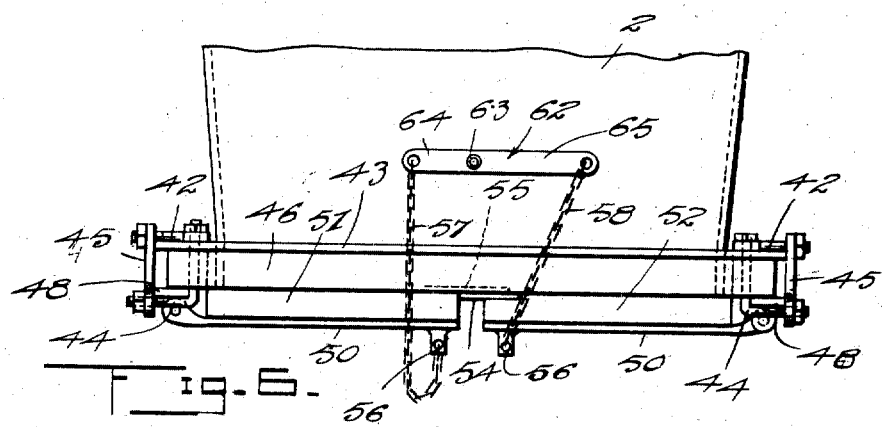
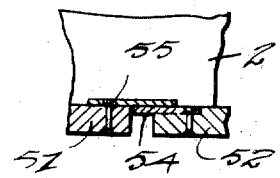

FLOYD E. McCLELLAN, OF TIFFIN, OHIO.

DUMP-WAGON.

1,248,879.   Specification of Letters Patent.   Patented Dec. 4, 1917.

Application filed February 11, 1916. Serial No. 77,688.

*To all whom it may concern:*

Be it known that I, FLOYD E. McCLELLAN, a citizen of the United States, residing at Tiffin, in the county of Seneca and State of Ohio, have invented certain new and useful Improvements in Dump-Wagons; and I do hereby declare the following to be a full, clear, and exact description of the invention, such as will enable others skilled in the art to which it appertains to make and use the same.

This invention relates to improvements in dump wagons, and an object of the invention is to provide a dump wagon, which is provided with a front compartment and a rear compartment and means for dumping these compartments independently of each other, so that the contents of one compartment may be dumped one place and the contents of the other compartment in a different place.

Another object of this invention is to provide in a dump wagon, a novel front axle structure, which includes a circular axle movable about the lower portion of the front compartment of the wagon, which axle replaces the ordinary fifth wheel of a wagon and also to provide bearing rollers which are supported by the front compartment and engage the upper surface of the circular axle, for facilitating the free movement of the axle.

A further object of this invention is to pivotally connect a tongue to the front circular axle, so as to provide what is known as a loose tongue, thereby eliminating the inconveniences of a stiff tongue and permitting the tongue to hang in its proper position between the horses at all times.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a top plan view of the improved dump wagon.

Fig. 2 is a side elevation of the dump wagon.

Fig. 3 is a front elevation of the dump wagon showing a part thereof broken away.

Fig. 4 is a plan view of the front axle showing the manner of connecting the tongue thereto.

Fig. 5 is a bottom plan of the front compartment.

Fig. 6 is a fragmentary rear elevation of the rear compartment of the dump wagon.

Fig. 7 is a fragmentary sectional view showing the meeting edges of the dumping doors.

Fig. 8 is a fragmentary sectional view through the rear compartment showing the manner of pivotally mounting the dumping doors, and Fig. 9 is a fragmentary sectional view through a part of the construction of the front compartment of the dump wagon.

Referring more particularly to the drawings, 1 designates the front compartment of the dump wagon and 2 designates the rear compartment of the dump wagon, which compartments are connected and braced by channel irons 3 which are bent to assume substantially the shape of an inverted U.

The front compartment 1, is circular in cross section, and is constructed of any suitable type of sheet metal, having its upper end flared as is shown at 4. The compartment 1 is made in any size desired for holding any predetermined quantity of material and it has a seat 5 of the ordinary spring type supported above its upper surface as clearly shown in Fig. 2 of the drawings.

The channel iron 6 is mounted about the lower portion of the body of the front compartment 1 and it has the front axle 7 positioned between the horizontal portions of the channel iron, as clearly shown in Figs. 2 and 3 of the drawing. In mounting the channel iron 6 upon the lower end of the compartment 1, the channel iron is split intermediate the edges of its vertical portion as is shown at 8, and the upper piece 9 is mounted upon and attached to the outer surface of the compartment 1 adjacent its lower end, after which the circular axle 7 is placed in its proper position, and the lower section 10 of the channel iron 6 is then put in its proper position and secured, in any suitable manner to the outer surface of the compartment 1. The front axle 7 is circular in shape, as clearly shown in Fig. 4 of the drawings, and it has diametrically opposed spindles 11 formed thereupon, upon which the ordinary type of wagon supporting wheels are mounted. Trunnions 12 project outwardly from the outer surface of the circular axle 7 forwardly of the spindles 11, and have pivotally connected thereto, the ends of a forked member 13. The forked member 13 has a pair of spaced arms 14 formed thereupon between which the inner end of an ordinary wagon tongue is seated, and by means of which the tongue is attached to the forked member 13. The ends 15 of the forked member 13 are pivotally mounted upon the trunnions 12, so as to permit of a free vertical pivotal movement of the tongue which is attached to the forked member.

The body of the compartment 1 has a plurality of brackets 18 connected thereto which rotatably support rollers 19. The rollers 19 extend through slots 20 which are formed in the upper horizontal portion 21 of the channel iron 6. The rollers 19 ride upon the upper surface of the axle 7 and are provided for facilitating the free and easy turning movement of the axle when the same is performing the function of an ordinary fifth wheel, as used upon wagons or analogous vehicles. The front and rear rollers 19 are preferably larger in diameter than the side rollers 19 so that the majority of the weight of the forward compartment will be borne by these rollers, thereby permitting of a tilting movement of the compartment 1 during the travel of the wagon over uneven places. Plates 22 and 23 are secured to the under surface of the horizontal portion of the channel irons 6 and they have ears 24 formed thereon in spaced pairs to which ears hinges or hinge bars 25 are pivotally connected by suitable pins or analogous devices 26. The hinge bars 25 are secured to the under surface of the dumping doors 27 and 28 which doors form closures for the bottom of the compartment 1.

The doors 27 and 28 have eyes 29 attached to their outer surface, adjacent their meeting ends, which eyes form guides for chains or analogous flexible members 30. The chains 30 extend through the eyes 29, and are connected by means of a swiveled connection 31 to the lower horizontal portion of the channel iron 6. The chains 30 extend upwardly through a depression 32, which is formed in the forward portion of the side wall of the compartment 1 and are connected for winding rotation upon a drum 33. The drum 33 is rotatably mounted upon a shaft 34, and it has a ratchet 35 mounted thereon for rotation therewith. The shaft 34 has a lever 36 loosely mounted thereon to which lever is pivotally connected a pawl 37. The pawl 37 is adapted for engagement with the ratchet teeth of the ratchet 35 for rotating the drum 33 upon oscillatory movement of the lever 36, for winding the chains upon the drum or permitting their unwinding from the drum for closing or opening the dumping doors 27 and 28.

The rear compartment 2 of the wagon bed is rectangularly shaped and it has an angled iron 40 connected to the sides 41 of the compartment adjacent their lower ends. The horizontal portion 42 of the angle iron 40 is provided with openings 43, through which the upper ends of clamping bolts 44 extend. The clamping bolts 44 coact with clamping plates 45 for clamping the rear axle 46 in engagement with the rear compartment 2. The axle 46 is rectangularly shaped in plan and has spindles 47 formed thereon for receiving the ordinary type of supporting wheels. The clamping bolts 44 and plates 45 also clamp plates 48 in engagement with the under surface of the side portions of the axles 46. The plates 48 have depending ears 49 formed thereupon to which are pivotally connected hinge bars 50. The hinge bars 50 are secured to the under surface of dump doors 51 and 52, and hingedly connect the doors to the compartment, for forming closures for the lower open end or bottom of the compartment. The doors 51 and 52 have their inner edges slightly spaced as clearly shown in Figs. 6 and 7 of the drawings. A plate 54 is countersunk in the upper surface of the door 52 and projects from the edge of the door for engagement with the inner edge of the door 51. A plate 55 is attached to the upper surface of the inner edge of the door 51 and overlaps the plate 54, for forming a tight joint between the meeting edges of the doors for preventing sand or analogous material from sifting through the space between the doors, during the travel of the wagon.

The doors 51 and 52 have depending eyes 56 attached to their under surfaces which eyes form guide ways for chains or flexible members 57 and 58. The chains or analogous flexible members 57 and 58 are connected to a shaft 61, which is positioned between the front and rear compartment 1 and 2. The shaft 61 has a chain 61' connected thereto, which chain extends forwardly and is connected to the shaft 34, for winding or unwinding upon or from the shaft. The shaft 34 has a ratchet 59 mounted thereon for rotation with the shaft, with which ratchet a pawl 60 which is carried by the lever 36 coacts for rotating the shaft upon oscillatory movement of the lever 36 for winding the flexible members 61' upon the shaft or permitting its unwinding therefrom, depending upon the direction in which the pawl 60 is positioned. The winding of the flexible member or chain 61 upon the shaft 34, or its unwinding therefrom will control the rotation of the shaft 61 for winding the chains or flexible members 57 and 58 upon the shaft 61, or permit the unwinding therefrom as desired.

The ends of the chains 57 and 58, remote from the ends which are attached to the shaft 34, are connected to the opposite end of a pivoted lever 62. The lever 62 is pivoted intermediate its end as is shown at 63, providing a relatively short end 64 and a relatively long end 65. The chain 57 is connected to the short end 64 while the chain 58 is connected to the long end 65. This lever, being pivoted unevenly, will cause one of the doors to close prior to the closing of the other, to insure the proper overlapping engagement between the plates 54 and 55.

If it is so desired, a structure similar to the lever 62 may be attached to the front compartment 1 for regulating the closing of the doors 27 and 28.

Upon the unwinding rotation of the shaft 34, or the drum 33, the weight of the doors 27 and 28 or 51 and 52, will unwind the chain from the roller or shaft and permit the doors to open for dumping the contents in either of the compartments 1 and 2.

The front compartment 1 has a foot rest 70 secured thereto, to the upper surface of which foot rest is pivotally connected a lever 71. The lever 71 has a pawl 72 connected thereto which pawl is adapted for engagement with the teeth of the ratchet 35 for locking the ratchet and consequently the drum 33 against accidental rotation. A second lever 73 is provided which has a pawl carried thereby for engagement with the ratchet teeth of the ratchet 59 for preventing accidental rotation of the ratchet 59 and the shaft 34. The lever 73 is also pivotally supported by the foot rest 70. Spiral springs 76 are provided which engage the under surfaces of the levers 71 and 73 for holding the pawl 72 in engagement with the teeth of the ratchets 35 and 59 respectively, except when the levers 71 and 73 are forced downwardly by the operator of the device.

From the foregoing description taken in connection with the accompanying drawings the advantages of construction and of the method of operation of the improved dump wagon will be readily apparent to those skilled in the art to which this invention appertains, and while in the foregoing description the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a dump wagon structure, a dumping compartment circular in plan, a circular axle mounted about said compartment, means for limiting the vertical movement of the axle with respect to the body, and wheel carrying spindles formed upon said axle.

2. In a dump wagon structure, a body circular in plan, a circular axle mounted about said body, wheel carrying spindles formed upon said axle, means for limiting the vertical movement of the axle with respect to the body, hinged doors forming a bottom for said body, and means for operating said doors.

3. In a dump wagon structure, a dumping compartment circular in plan, a circular axle mounted about said body, means for limiting the vertical movement of the axle with respect to the body, rollers carried by said dumping compartment and engaging said axle.

4. In a dump wagon structure, a dumping compartment, a channel iron secured to the outer surface of said compartment adjacent its lower ends, a circular axle seated in said channel iron, hinged doors forming a bottom for said compartment, and means for operating said doors.

5. In a dump wagon structure, a dumping compartment, circular in plan, a channel iron secured to the outer surface of said compartment adjacent its lower end, an axle seated in said channel iron and having wheel carrying spindles formed thereon, said axle being circular in plan.

6. In a dump wagon structure, a dumping compartment circular in plan, a channel iron secured to the outer surface of said compartment adjacent its lower end, a circular axle seated in said channel iron and having wheel carrying spindles formed thereon, and a plurality of bearing rollers rotatably carried by said front compartment and engaging the upper edge of said axle.

7. In a dump wagon structure, a body circular in plan, a channel iron secured to the outer surface of said compartment adjacent its lower end, a circular axle seated in said channel iron and having wheel carrying spindles formed thereon, a plurality of bearing rollers rotatably carried by said front compartment and engaging the upper edge of said axle, doors hingedly carried by said compartment and forming closures for the bottom of the compartment, flexible members engaging said doors for closing the doors, and means for operating said flexible members for permitting of the opening of the doors or for closing the doors.

In testimony whereof I affix my signature in presence of two witnesses.

FLOYD E. McCLELLAN.

Witnesses:
CLYDE C. PORTER,
JAMES D. WATSON.